US012681191B2

(12) United States Patent
Motos

(10) Patent No.: US 12,681,191 B2
(45) Date of Patent: Jul. 14, 2026

(54) TIME-OF-FLIGHT ESTIMATION USING SAMPLING ERROR VALUES

(71) Applicant: Texas Instruments Incorporated, Dallas, TX (US)

(72) Inventor: Tomas Motos, Hamar (NO)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 189 days.

(21) Appl. No.: 18/766,819

(22) Filed: Jul. 9, 2024

(65) Prior Publication Data

US 2024/0361467 A1      Oct. 31, 2024

Related U.S. Application Data

(63) Continuation of application No. 18/324,276, filed on May 26, 2023, now Pat. No. 12,061,274, which is a continuation of application No. 17/241,938, filed on Apr. 27, 2021, now Pat. No. 11,709,276.

(51) Int. Cl.
| | |
|---|---|
| *G01S 19/25* | (2010.01) |
| *G01S 19/35* | (2010.01) |
| *H04W 4/80* | (2018.01) |

(52) U.S. Cl.
CPC ............ *G01S 19/256* (2013.01); *G01S 19/35* (2013.01); *H04W 4/80* (2018.02)

(58) Field of Classification Search
CPC ...... G01S 19/256; G01S 19/35; G01S 13/765; H04W 4/80; H04W 4/40
USPC ...................................................... 455/456.1
See application file for complete search history.

(56) References Cited

U.S. PATENT DOCUMENTS

| | | | | | |
|---|---|---|---|---|---|
| 6,760,798 | B1 * | 7/2004 | Aldworth | ................. | G06F 1/14 |
| | | | | | 710/118 |
| 7,450,069 | B2 * | 11/2008 | Heidari-Bateni | ..... | G01S 13/767 |
| | | | | | 342/458 |
| 10,948,584 | B2 | 3/2021 | Olson | | |
| 11,709,276 | B2 | 7/2023 | Motos | | |
| 2004/0027281 | A1 | 2/2004 | Akopian | | |
| 2010/0189206 | A1 * | 7/2010 | Kagan | ................... | H04J 3/0697 |
| | | | | | 375/354 |
| 2010/0315291 | A1 * | 12/2010 | Rakijas | .................... | G01S 5/14 |
| | | | | | 342/387 |

(Continued)

*Primary Examiner* — Don N Vo

(74) *Attorney, Agent, or Firm* — Michelle F. Murray; Frank D. Cimino

(57) ABSTRACT

A circuit includes a first wireless radio frequency (RF) transceiver and a time-of-flight estimator included with or coupled to the first wireless RF transceiver. The time-of-flight estimator estimates a time-of-flight between the first wireless RF transceiver and a second wireless RF transceiver using: a first interval value that indicates an amount of time between when the second wireless RF transceiver received the message and when the second wireless RF transceiver transmitted the response; a first error value that indicates an offset between when the second wireless RF transceiver sampled the message and a target sampling point for the message; a second interval value that indicates an amount of time between when the TX chain sent the message and when the RX chain received the response; and a second error value that indicates an offset between when the RX chain sampled the response and a target sampling point for the response.

20 Claims, 9 Drawing Sheets

(56)                    References Cited

U.S. PATENT DOCUMENTS

| | | |
|---|---|---|
| 2020/0252751 A1 | 8/2020 | Wirola |
| 2021/0011144 A1 | 1/2021 | Crosby, II |
| 2021/0103046 A1 | 4/2021 | Waheed |
| 2022/0091253 A1 | 3/2022 | Ootaka |
| 2022/0299590 A1 | 9/2022 | Booij |

\* cited by examiner

500

502

PROCESSOR(S)

- OBTAIN VALUES FOR Ta, Tb, Da, Db FOR EACH OF A PLURALITY OF MESSAGES
  - AVERAGE OR OTHER COMBINATION
- ESTIMATE ToF BASED ON THE VALUES FOR Ta, Da, Tb, Db
- COMPARE ESTIMATED ToF TO THRESHOLD
- ASSERT FAULT SIGNAL IF ESTIMATED ToF GREATER THAN THE THRESHOLD

506

MEMORY   508

ToF EST INPUTS ANALYZER

THRESHOLD

510

Ta, Tb, Da, Db OR RELATED PARAMETERS

FAULT

700

CORRECT TIMING:
$e_n = (-1\ -1) * 0 = 0$

710

TIMING IS LATE:
$e_n = (-0.8\ -0.8) * (-0.2) = 0.32$

720

TIMING IS EARLY:
$e_n = (-0.8\ -0.8) * (0.2) = -0.32$

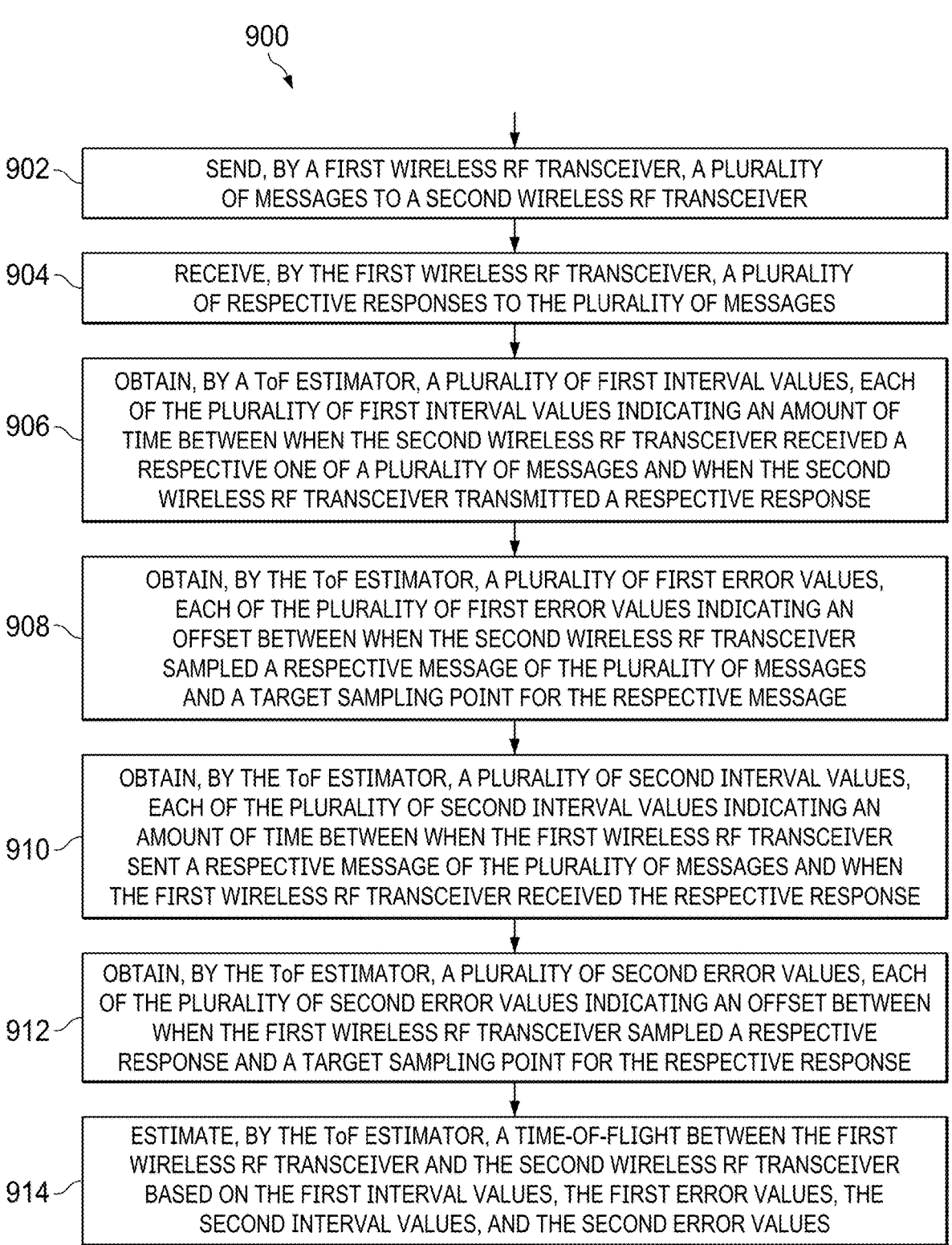

900

902 — SEND, BY A FIRST WIRELESS RF TRANSCEIVER, A PLURALITY OF MESSAGES TO A SECOND WIRELESS RF TRANSCEIVER

904 — RECEIVE, BY THE FIRST WIRELESS RF TRANSCEIVER, A PLURALITY OF RESPECTIVE RESPONSES TO THE PLURALITY OF MESSAGES

906 — OBTAIN, BY A ToF ESTIMATOR, A PLURALITY OF FIRST INTERVAL VALUES, EACH OF THE PLURALITY OF FIRST INTERVAL VALUES INDICATING AN AMOUNT OF TIME BETWEEN WHEN THE SECOND WIRELESS RF TRANSCEIVER RECEIVED A RESPECTIVE ONE OF A PLURALITY OF MESSAGES AND WHEN THE SECOND WIRELESS RF TRANSCEIVER TRANSMITTED A RESPECTIVE RESPONSE

908 — OBTAIN, BY THE ToF ESTIMATOR, A PLURALITY OF FIRST ERROR VALUES, EACH OF THE PLURALITY OF FIRST ERROR VALUES INDICATING AN OFFSET BETWEEN WHEN THE SECOND WIRELESS RF TRANSCEIVER SAMPLED A RESPECTIVE MESSAGE OF THE PLURALITY OF MESSAGES AND A TARGET SAMPLING POINT FOR THE RESPECTIVE MESSAGE

910 — OBTAIN, BY THE ToF ESTIMATOR, A PLURALITY OF SECOND INTERVAL VALUES, EACH OF THE PLURALITY OF SECOND INTERVAL VALUES INDICATING AN AMOUNT OF TIME BETWEEN WHEN THE FIRST WIRELESS RF TRANSCEIVER SENT A RESPECTIVE MESSAGE OF THE PLURALITY OF MESSAGES AND WHEN THE FIRST WIRELESS RF TRANSCEIVER RECEIVED THE RESPECTIVE RESPONSE

912 — OBTAIN, BY THE ToF ESTIMATOR, A PLURALITY OF SECOND ERROR VALUES, EACH OF THE PLURALITY OF SECOND ERROR VALUES INDICATING AN OFFSET BETWEEN WHEN THE FIRST WIRELESS RF TRANSCEIVER SAMPLED A RESPECTIVE RESPONSE AND A TARGET SAMPLING POINT FOR THE RESPECTIVE RESPONSE

914 — ESTIMATE, BY THE ToF ESTIMATOR, A TIME-OF-FLIGHT BETWEEN THE FIRST WIRELESS RF TRANSCEIVER AND THE SECOND WIRELESS RF TRANSCEIVER BASED ON THE FIRST INTERVAL VALUES, THE FIRST ERROR VALUES, THE SECOND INTERVAL VALUES, AND THE SECOND ERROR VALUES

FIG. 9

TIME-OF-FLIGHT ESTIMATION USING SAMPLING ERROR VALUES

CROSS-REFERENCE TO RELATED APPLICATIONS

This application is a continuation of U.S. patent application Ser. No. 18/324,276, filed May 26, 2023, which is a continuation of U.S. patent application Ser. No. 17/241,938, filed Apr. 27, 2021, now U.S. Pat. No. 11,709,276, which applications are hereby incorporated herein by reference.

BACKGROUND

As new electronic devices are developed and integrated circuit (IC) technology advances, new IC products are commercialized. One example IC product for electronic devices is a wireless radio frequency (RF) transceiver. One parameter of interest for electronic devices with a wireless RF transceiver is the time-of-flight (ToF) between wireless devices. The ToF provides a direct measure of distance. Also, distance can be used to determine other parameters such as presence detection, spatial positioning, and relative movement.

One problem of measuring ToF is the time resolution. As RF signals travel at the speed of light, an electronic device needs to be able to measure time within a few nanoseconds in order to be able to measure distance accurately to within a few meters. In one example, electronic devices implementing Bluetooth Low Energy (BLE) RF protocols sample incoming signals using a clock of a few MHz (e.g., a symbol rate of 1 Msym/s). As an example, if the sampling rate is 4 MHZ, the period is 250 ns. This period is 10 to 50 times larger than the ToF needed to discern distance accurately to within a few meters (e.g., 3 meters of round-trip time equals to 20 ns).

FIG. 1 is a block diagram of a system 100 in accordance with a conventional approach. As shown, the system 100 includes a vehicle 122 and a related key fob 102 in communication via a wireless communication channel 106. Communications between the key fob 102 and the vehicle 122 are performed via the wireless communication channel 106 using a wireless RF transceiver 104 of the key fob 102 and a wireless RF transceiver 124 of the vehicle 122. In different examples, the key fob 102 communicates with or responds to the vehicle 122 to initiate operations related to different vehicle subsystems 140, such as: door locks, the engine, an alarm system, lights, and/or a display.

The development of relay attacks to steal vehicles is currently an important security issue. In a relay attack, first and second relay devices 108 and 110 are used to extend the communication range between the vehicle 122 and the key fob 102 and to obtain access to the vehicle 122 while the driver (whoever has the key fob 102) is away from the vehicle 122. More specifically, the first relay device 108 is within the normal range (e.g., a few meters) of the key fob 102, while the second relay device 110 is within the normal range (e.g., a few meters) of the vehicle 122. The distance between the first and second relay devices 108 and 110 is typically greater than the range of the key fob 102 and the vehicle 122 to facilitate stealing the vehicle 122. In an example relay attack, the following operations may be performed: 1) a wake up signal is conveyed over an extended range from the vehicle 122 to the key fob 102; 2) an acknowledge (ACK) signal is conveyed over an extended range from the key fob 102 to the vehicle 122; 3) a car identification (ID) with challenge is conveyed over an extended range from the vehicle 122 to the key fob 102; and 4) a key response is conveyed over an extended range from the key fob 102 to the vehicle 122.

One way to detect and thus avoid a relay attack would be to estimate the ToF of signals conveyed between the key fob 102 and the vehicle 122. However, as noted previously, the sampling rate of conventional wireless RF transceivers is not fast enough to track ToF and related distance estimations to within the accuracy needed to detect relay attacks.

SUMMARY

In at least one example, a circuit comprises a first wireless radio frequency (RF) transceiver that includes: a transmit (TX) chain configured to send a message; and a receive (RX) chain configured to receive a response to the message from a second wireless RF transceiver. The circuit also comprises: a time-of-flight estimator coupled to or included with the RX chain, the time-of-flight estimator is configured to: obtain a first interval value that indicates an amount of time between when the second wireless RF transceiver received the message and when the second wireless RF transceiver transmitted the response; obtain a first error value that indicates an offset between when the second wireless RF transceiver sampled the message and a target sampling point for the message; obtain a second interval value that indicates an amount of time between when the TX chain sent the message and when the RX chain received the response; obtain a second error value that indicates an offset between when the RX chain sampled the response and a target sampling point for the response; and estimate a time-of-flight between the first wireless RF transceiver and the second wireless RF transceiver based on the first interval value, the first error value, the second interval value, and the second error value.

In another example, a system comprises a first wireless RF transceiver; and a time-of-flight estimator included with or coupled to the first RF wireless transceiver. The time-of-flight estimator configured to: obtain a first interval value that indicates an amount of time between when a second wireless RF transceiver received a message from the first wireless RF transceiver and when the second wireless RF transceiver transmitted the response; obtain a first error value that indicates an offset between when the second wireless RF transceiver sampled the message and a target sampling point for the message; obtain a second interval value that indicates an amount of time between when the first wireless RF transceiver sent the message and when the first wireless RF transceiver received the response; obtain a second error value that indicates an offset between when the first wireless RF transceiver sampled the response and a target sampling point for the response; and estimate a time-of-flight based on the first interval value, the first error value, the second interval value, and the second error value.

In yet another embodiment, a method comprises: sending, by a first wireless RF transceiver, a plurality of messages to a second wireless RF transceiver; and receiving, by the first wireless RF transceiver, a plurality of respective responses to the plurality of messages. The method also comprises: obtaining, by a time-of-flight estimator, a plurality of first interval values, each of the plurality of first interval values indicating an amount of time between when the second wireless RF transceiver received a respective one of a plurality of messages and when the second wireless RF transceiver transmitted a respective response; obtaining, by the time-of-flight estimator, a plurality of first error values, each of the plurality of first error values indicating an offset between when the second wireless RF transceiver sampled a respective message of the plurality of messages and a target sampling point for the respective message; obtaining, by the time-of-flight estimator, a plurality of second interval values, each of the plurality of second interval values indicating an amount of time between when the first wireless RF transceiver sent a respective message of the plurality of messages and when the first wireless RF transceiver received the respective response; obtaining, by the time-of-flight estimator, a plurality of second error values, each of the plurality of second error values indicating an offset between when the first wireless RF transceiver sampled a respective response and a target sampling point for the respective response; and estimating, by the time-of-flight estimator, a time-of-flight between the first wireless RF transceiver and the second wireless RF transceiver based on the first interval values, the first error values, the second interval values, and the second error values.

BRIEF DESCRIPTION OF THE DRAWINGS

FIG. 9 is a flow chart of a time-of-flight estimation method in accordance with an example embodiment.

The same reference numbers are used in the drawings to depict the same or similar features.

DETAILED DESCRIPTION

Figure 1:
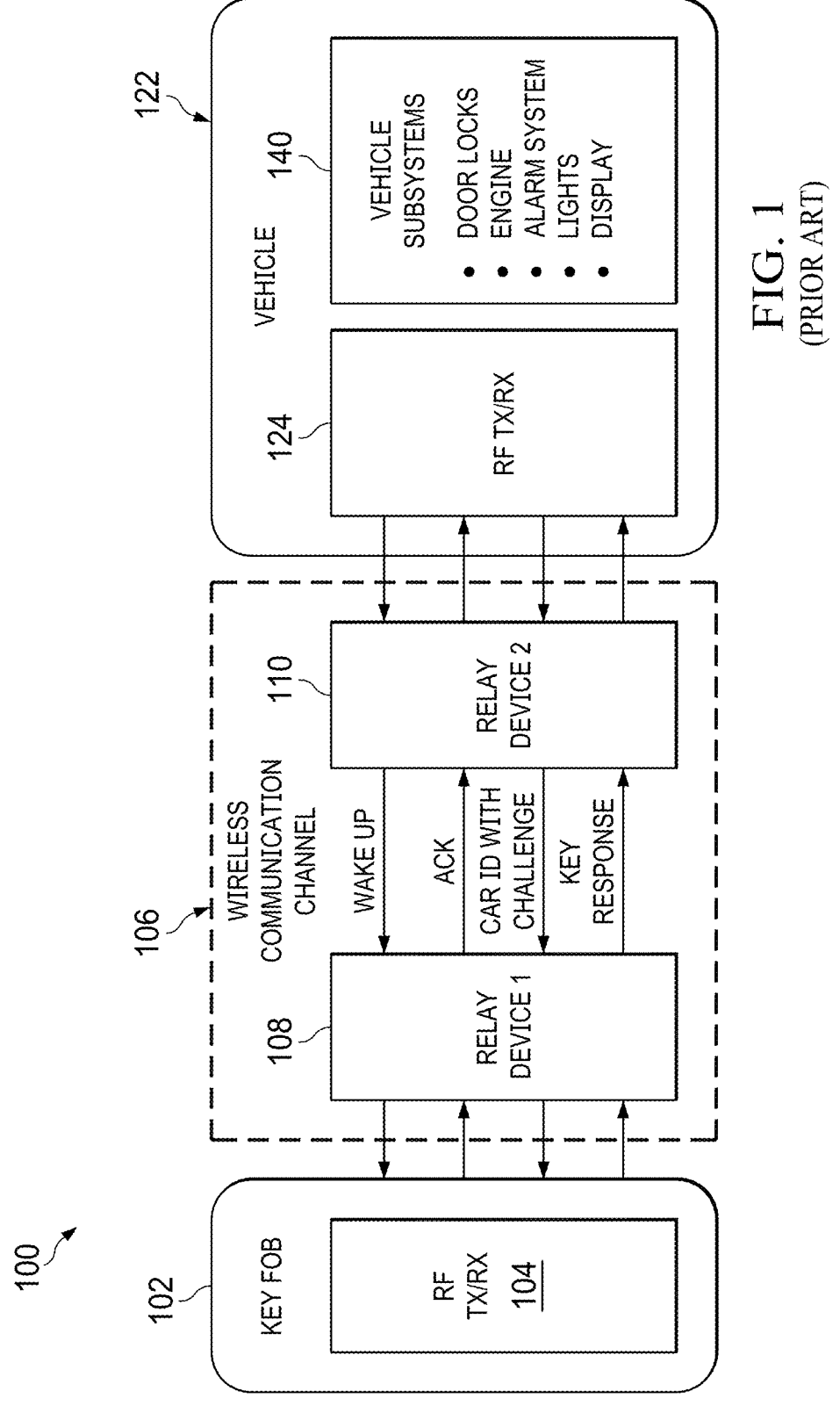
FIG. 1 is a block diagram of a system in accordance with a conventional approach.

Described herein is a time-of-flight (ToF) estimation technique to determine the distance between wireless radio frequency (RF) transceivers. In the description, the wireless RF transceivers are components of a vehicle and a key fob, and the ToF estimate is used to detect and prevent a relay attack. However, it should be understood that the described ToF estimation technique may be used for another purpose and/or setting. The ToF provides a direct measure of distance to within a target tolerance. Also, distance can be used to determine other parameters such as presence detection, spatial positioning, and relative movement. As desired, it is possible to extend to the ToF estimation techniques described herein to more than two wireless RF transceivers.

In some example embodiments, the ToF estimation technique involves wireless RF transceivers configured to send and receive messages in accordance with a wireless protocol such as Bluetooth or BLE. Each of the wireless RF transceivers is also configured to determine some of ToF estimation inputs used. The ToF estimation inputs are used by a ToF estimator included with or coupled to a wireless RF transceiver. In one example, each wireless RF transceiver is an integrated circuit (IC) or is part of an IC. In different example embodiments, the ToF estimator is included with the same IC as a wireless RF transceiver or is included with another IC coupled to the IC with the wireless RF transceiver.

In some example embodiments, ToF estimation involves a first wireless RF transceiver and a second ToF wireless RF transceiver. In these example embodiments, the ToF estimation inputs include: a first interval value (sometimes labeled "Tb" herein) that indicates an amount of time between when the second wireless RF transceiver received a message from the first second wireless RF transceiver and when the second wireless RF transceiver transmitted a related response; and a first error value (sometimes labeled "Db" herein) that indicates an offset between when the second wireless RF transceiver sampled the message and a target sampling point for the message. The first interval value and the first error value are provided, for example, by a second wireless RF transceiver included with a key fob. The ToF estimation inputs also include: a second interval value (sometimes labeled "Ta" herein) that indicates an amount of time between when the first wireless RF transceiver sent the message and when the first wireless RF transceiver received the response from the second wireless RF transceiver; and a second error value (sometimes labeled "Da" herein) that indicates an offset between when the first wireless RF transceiver sampled the response and a target sampling point for the response. In some example embodiments, a ToF estimator uses the first interval value, the first error value, the second interval value, and the second error value to determine a ToF estimate. With these values, the ToF estimate has a higher accuracy compared to conventional approaches that only use the first and second interval values.

To further improve accuracy, multiple samples are collected for each of the first interval value, the first error value, the second interval value, and the second error value. In this case, the first wireless RF transceiver sends a plurality of messages and receives a plurality of responses back from the second wireless RF transceiver. The second wireless RF transceiver is configured to determine and send back first interval values (Tb values) and first error values (Db values) related to the plurality of messages and related responses. Also, the first wireless RF transceiver is configured to determine second interval values (Ta values) and second error values (Da values) related to the plurality of messages and related responses. In some example embodiments, the ToF estimator uses the first interval values, the first error values, the second interval values, and the second error values to determine a ToF estimate. One option is for the Tof estimator to determine a ToF estimate based on an average of the first interval values, an average of the first error values, an average of the second interval values, and an average of the second error values. In some example embodiments, the ToF estimate is calculated as: $ToF=0.5*((Ta-Tb)-(Da+Db))$. In different example embodiments, the number of Ta, Tb, Da, Db values used for ToF estimation varies. If more ToF accuracy is desired, the number of Ta, Tb, Da, Db values used to determine a ToF estimate can be increased. If estimation speed or power consumption reduction has priority over ToF accuracy, the number of Ta, Tb, Da, Db samples used to determine a ToF estimate can be decreased. The target accuracy of the ToF estimate may also vary according to its desired application (e.g., distance detection, presence detection, spatial positioning, and/or relative movement).

In one example embodiment, the ToF estimate is used to enhance vehicle security by detecting relay attacks or another fault condition. The described solutions provide a low-power, low-complexity solution using wireless RF transceivers compatible with wireless protocols such as Bluetooth or BLE. These wireless RF transceivers use just a few mW of power when receiving or transmitting.

Figure 2:
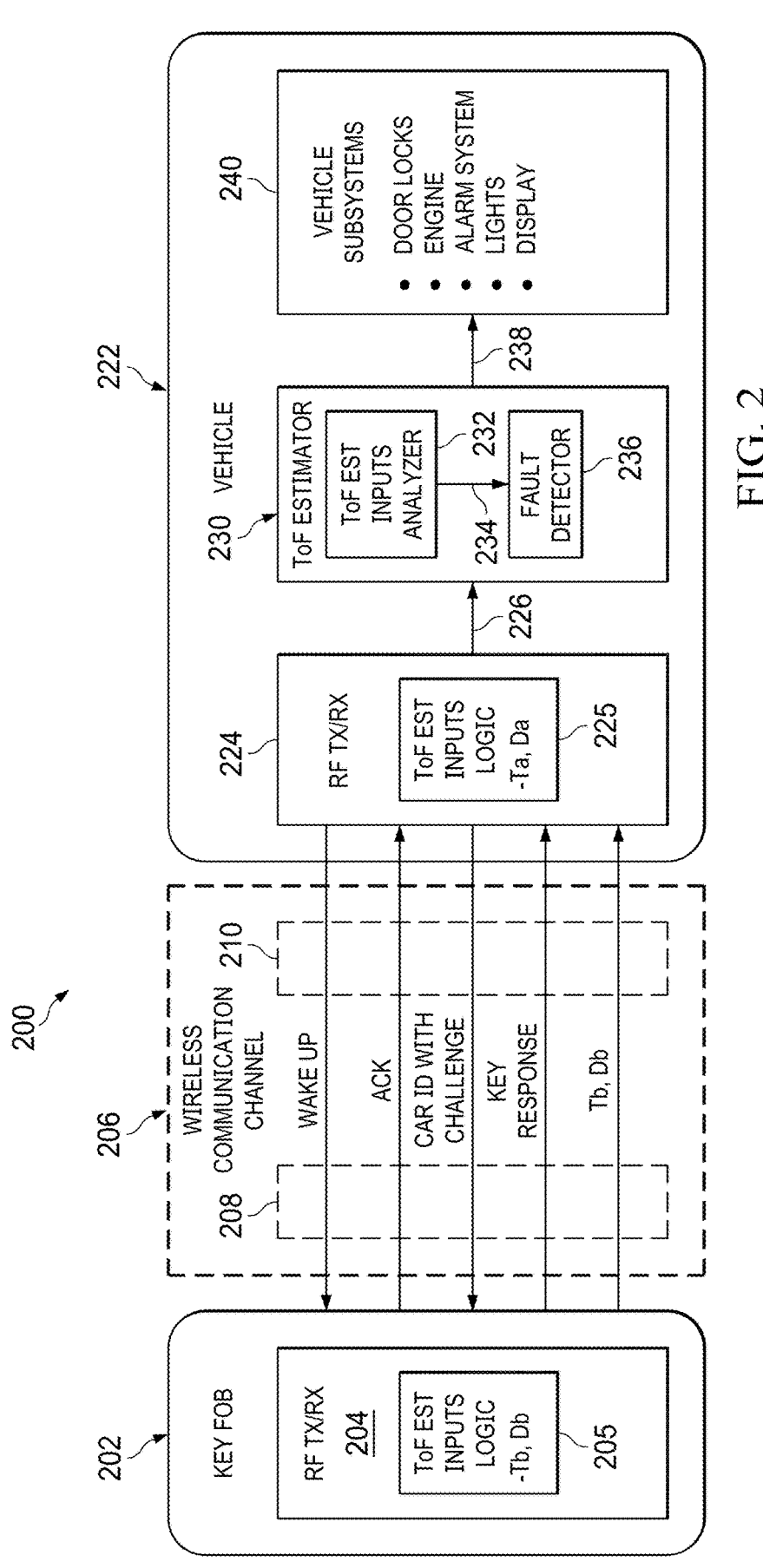
FIG. 2 is a block diagram of a system in accordance with an example embodiment.

FIG. 2 is a block diagram of a system 200 in accordance with an example embodiment. As shown, the system 200 includes a vehicle 222 and a related key fob 202 in communication via a wireless communication channel 206. Communications between the key fob 202 and the vehicle 222 are performed via the wireless communication channel 206 using a first wireless RF transceiver 224 of the vehicle 222 and a second wireless RF transceiver 204 of the key fob 202. In different scenarios, the key fob 202 communicates with or responds to the vehicle 222 to initiate operations related to different vehicle subsystems 240, such as: door locks, the engine, an alarm system, lights, and/or a display.

To detect and avoid relay attacks, the vehicle 222 includes a ToF estimator 230 with a ToF estimation inputs analyzer 232 and a fault detector 236. In operation, the ToF estimation inputs analyzer 232 obtains Ta, Tb, Da, and Db values from the first and second transceivers 224 and 204. More specifically, the first wireless RF transceiver 224 includes ToF estimation inputs logic 225 configured to provide Ta, Da values to the ToF estimation inputs analyzer 232. Also, the second wireless RF transceiver 204 includes ToF estimation inputs logic 205 configured to provide Tb, Db values to the ToF estimation inputs analyzer 232.

The ToF estimation inputs analyzer 232 uses the obtained Ta, Tb, Da, and Db values to determine a ToF estimate 234. The ToF estimate 234 (or related parameter) is provided to the fault detector 236, which compares the ToF estimate 234 (or related parameter) with a threshold. If the ToF estimate 234 (or related parameter) is greater than the threshold, the fault detector 236 asserts a fault signal 238 to one or more of the vehicle subsystems 240. In one example, a ToF greater than the threshold indicates a relay attack, and the fault signal 238 causes a related response such as sounding an alarm, turning on lights to signal an alarm, disabling the engine, or other actions.

In some example embodiments, Ta, Tb, Da, and Db values are determined based on the first wireless RF transceiver 224 sending messages and the second wireless RF transceiver sending responses to the messages. In some example embodiments, the message is a car identification (ID) with challenge transmitted by the first wireless RF transceiver 224 to the second wireless RF transceiver 204, and the response is a key response transmitted by the second wireless RF transceiver 204 to the first wireless RF transceiver 224. In some example embodiments, such messages and responses are initiated after the first wireless RF transceiver 224 sends a wake up signal to the second wireless RF transceiver 204 and receives an ACK signal back from the second wireless RF transceiver 204. Without a relay attack, the ToF of the car ID with challenge and/or the ToF of the key response will be equal to or less than a threshold corresponding to a few meters (e.g., 3 meters one way). In the event of a relay attack (e.g., by the addition of relay devices 208 and 210), the ToF of the car ID with challenge and/or the ToF of the key response will be greater than the threshold. One way to detect and thus avoid a relay attack is to estimate the ToF of signals conveyed between the key fob 102 and the vehicle 122 using Ta, Tb, Da, and Db values. Compared to conventional ToF estimation techniques, the use of Da and Db values increases accuracy with a reduced number of samples.

Figure 3:
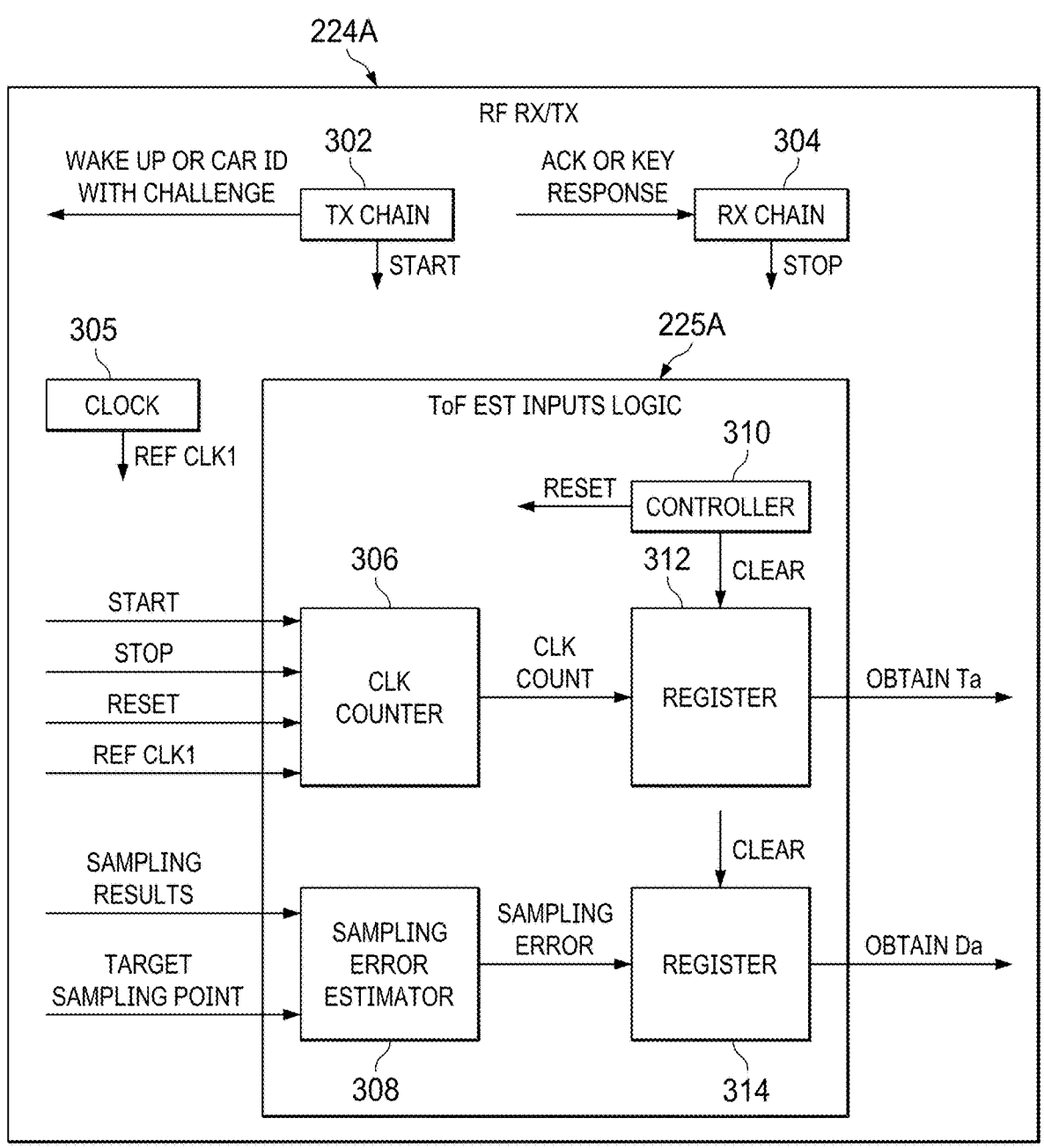
FIG. 3 is a block diagram of a first wireless radio frequency (RF) transceiver in accordance with an example embodiment.

FIG. 3 is a block diagram of a first wireless RF transceiver 224A (an example of the first wireless RF transceiver 224 that is part of the vehicle 222 in FIG. 2) in accordance with an example embodiment. As shown, the first wireless RF transceiver 224A includes a transmit (TX) chain 302 configured to send a wake up signal or a car ID with challenge to a second wireless RF transceiver. In some example embodiments, the TX chain 302 is configured to provide a start signal to ToF estimation inputs logic 225A (an example of the ToF estimation inputs logic 225 in FIG. 2) when a car ID with challenge is sent. The first wireless RF transceiver 224A also includes a receive (RX) chain 304 configured to receive an ACK signal or key response from a second wireless RF transceiver. In some example embodiments, the RX chain 304 is configured to provide a stop signal to the ToF estimation inputs logic 225A when a key response is received. As shown, the first wireless RF transceiver 224A also includes a clock 305, which provides a reference clock (REF CLK1) to the ToF estimation inputs logic 225A.

In the example of FIG. 3, the ToF estimation inputs logic 225A includes a clock counter 306, a sampling error estimator 308, a controller 310, and registers 312 and 314. In some example embodiments, the clock counter 306 is coupled to: the TX chain 302 to receive the start signal; the RX chain 304 to receive the stop signal; the clock 305 to receive REF CLK1; and the controller 310 to receive a reset signal. In operation, the clock counter 306 counts the number of REF CLK1 cycles between the start and stop signals. The clock count or related time information is stored in the register 312 and is used to obtain a Ta value. The obtained Ta values are stored, combined (e.g., averaged or other combination) in some example embodiments, and provided to a ToF estimator for ToF estimation as described herein. As needed, the clock counter 306 is reset and the register 312 is cleared for reuse.

In the example of FIG. 3, the sampling error estimator 308 receives sampling results from sampling responses (e.g., key responses) from a second wireless RF transceiver. The sampling error estimator 308 also receives target sampling information. The sampling results and the target sampling information are used by the sampling error estimator 308 to determine a sampling error or related time information. The sampling error or related time information is stored in a register 314 and is used to obtain a Da value. The obtained Da values are stored, combined (e.g., averaged or other combination) in some example embodiments, and provided to a ToF estimator for ToF estimation as described herein. As needed, the register 314 is cleared for reuse. In some example embodiments, the sampling error estimator 308 is a processor and memory with instructions. In operation, the sampling error estimator 308 determines if sampling of a response occurs early or late relative to a target sampling point. The sampling error estimator 308 may also determine by how much sampling of a response is early or late.

Figure 4:
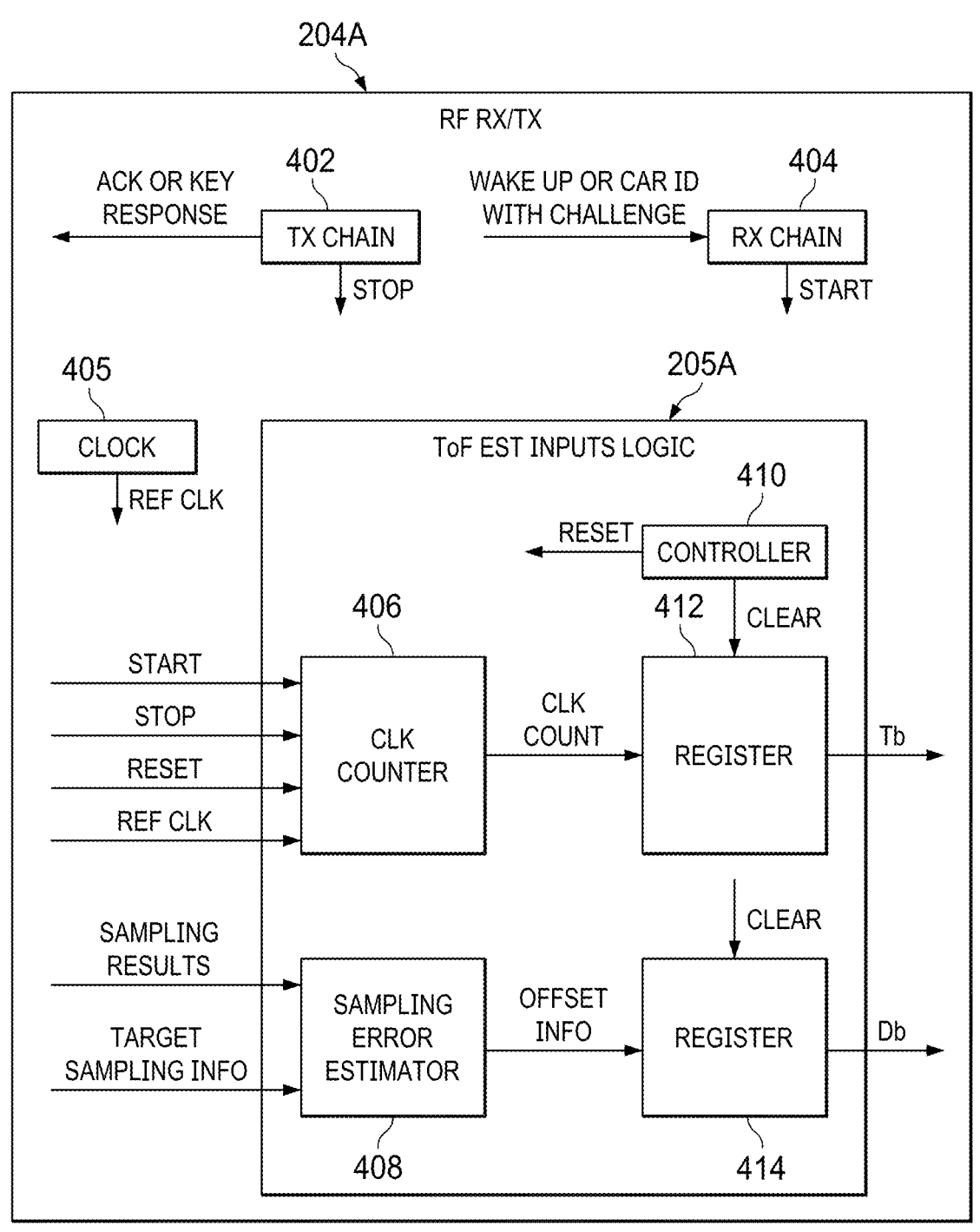
FIG. 4 is a block diagram of a second wireless RF transceiver in accordance with an example embodiment.

FIG. 4 is a block diagram of a second wireless RF transceiver 204A (an example of the second wireless RF transceiver 204 that is part of the vehicle key fob 202 in FIG. 2) in accordance with an example embodiment. As shown, the second wireless RF transceiver 204A includes a TX chain 402 configured to send an ACK signal or key response to a first wireless RF transceiver. In some example embodiments, the TX chain 402 is configured to provide a stop signal to ToF estimation inputs logic 205A (an example of the ToF estimation inputs logic 205 in FIG. 2) when a key response is sent. The second wireless RF transceiver also includes a RX chain 404 configured to receive an wake up signal or car ID with challenge from a first wireless RF transceiver. In some example embodiments, the RX chain 404 is configured to provide a start signal to the ToF estimation inputs logic 205A when a car ID with challenge is received. As shown, the second RF transceiver 204A also includes a clock 405, which provides a reference clock (REF CLK2) to the ToF estimation inputs logic 225A.

In the example of FIG. 4, the ToF estimation inputs logic 205A includes a clock counter 406, a sampling error estimator 408, a controller 410, and registers 412 and 414. In some example embodiments, the clock counter 406 is coupled to: the TX chain 402 to receive the stop signal; the RX chain 404 to receive the start signal; the clock 405 to receive REF CLK2; and the controller 410 to receive a reset signal. In operation, the clock counter 406 counts the number of REF CLK2 cycles between the start and stop signals. The clock count or related time information is stored in the register 412 and is used to obtain a Tb value. The obtained Tb values are stored, combined (e.g., averaged or other combination) in some example embodiments, and provided to a ToF estimator for Tof estimation as described herein. As needed, the clock counter 406 is reset and the register 412 is cleared for reuse.

In the example of FIG. 4, the sampling error estimator 408 receives sampling results from sampling messages (e.g., the car ID with challenge) from a first wireless RF transceiver. The sampling error estimator 408 also receives target sampling information. The sampling results and the target sampling information are used by the sampling error estimator 408 to determine a sampling error or related time information. The sampling error or related time information is stored in a register 414 and is used to obtain a Db value. The obtained Db values are stored, combined (e.g., averaged or other combination) in some example embodiments, and provided to a ToF estimator for Tof estimation as described herein. As needed, the register 414 is cleared for reuse. In some example embodiments, the sampling error estimator 408 is a processor and memory with instructions. In operation, the sampling error estimator 408 determines if sampling of a message occurs early or late relative to a target sampling point. The sampling error estimator 408 may also determine by how much sampling of a message is early or late.

Figure 5:
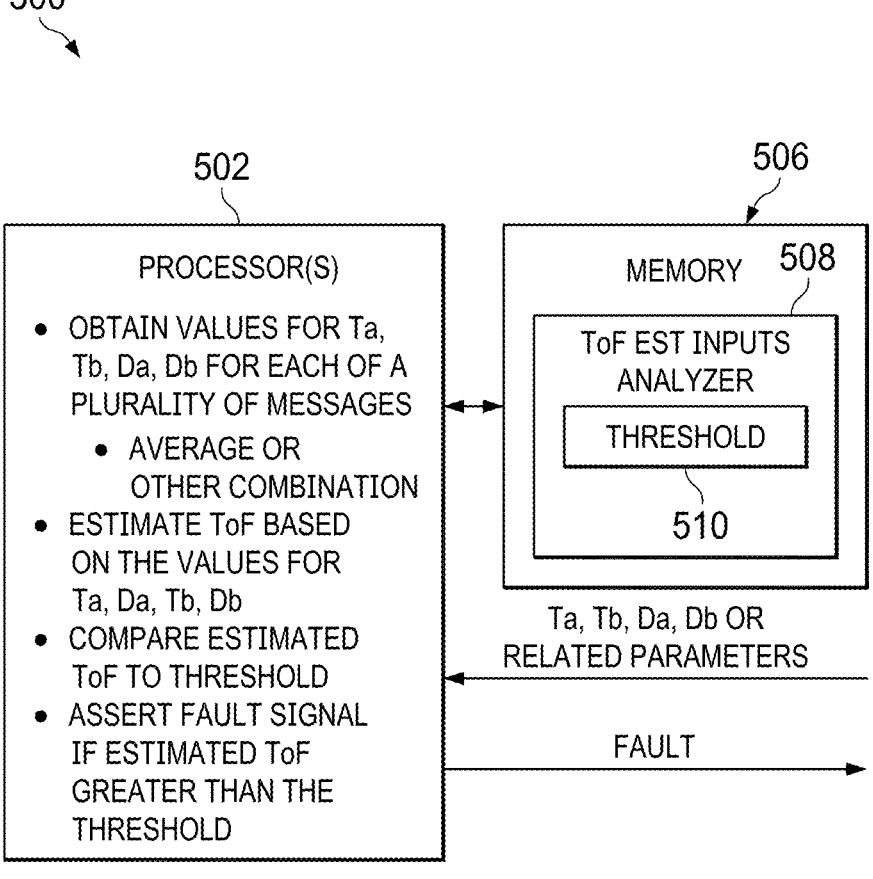
FIG. 5 is a block diagram of a processing system in accordance with an example embodiment.

FIG. 5 is a block diagram of a processing system 500 in accordance with an example embodiment. In some examples, the processing system 500 is included with or is coupled to a ToF estimator (e.g., the ToF estimator 230 of FIG. 2). As shown, the processing system 500 includes processor(s) 502 coupled to a memory 506 storing instructions of a ToF estimation input analyzer 508 (an example of the ToF estimation input analyzer 232 in FIG. 2). In operation, the processor(s) 502 obtains Ta, Da, Ta, and Db values or related parameters. If related parameters are obtained, the processor(s) 502 is able to derive Ta, Da, Ta, and Db values from the related parameters. In some example embodiments, the processor(s) 502 may average or otherwise combine the obtained Ta, Da, Ta, and Db values. The processor(s) 502 uses the Ta, Tb, Da, Db values to estimate ToF. In some example embodiments, the ToF estimate is calculated as: ToF=0.5*((Ta−Tb)−(Da+Db)). The processor(s) 502 then compare the ToF estimate to a threshold 510. If the ToF estimate is greater than the threshold 510, the processor(s) 502 assert a fault signal. In a vehicle and key fob scenario, the threshold 510 may be related to relay attack threshold (e.g., the ToF estimate indicates that a key fob is far enough away from a related vehicle that relay devices are in use). In such case, the fault signal is provided to one or more vehicle subsystems or related controllers to disable the vehicle's engine, initiate an alarm, or other response to relay attack options.

Figure 6:
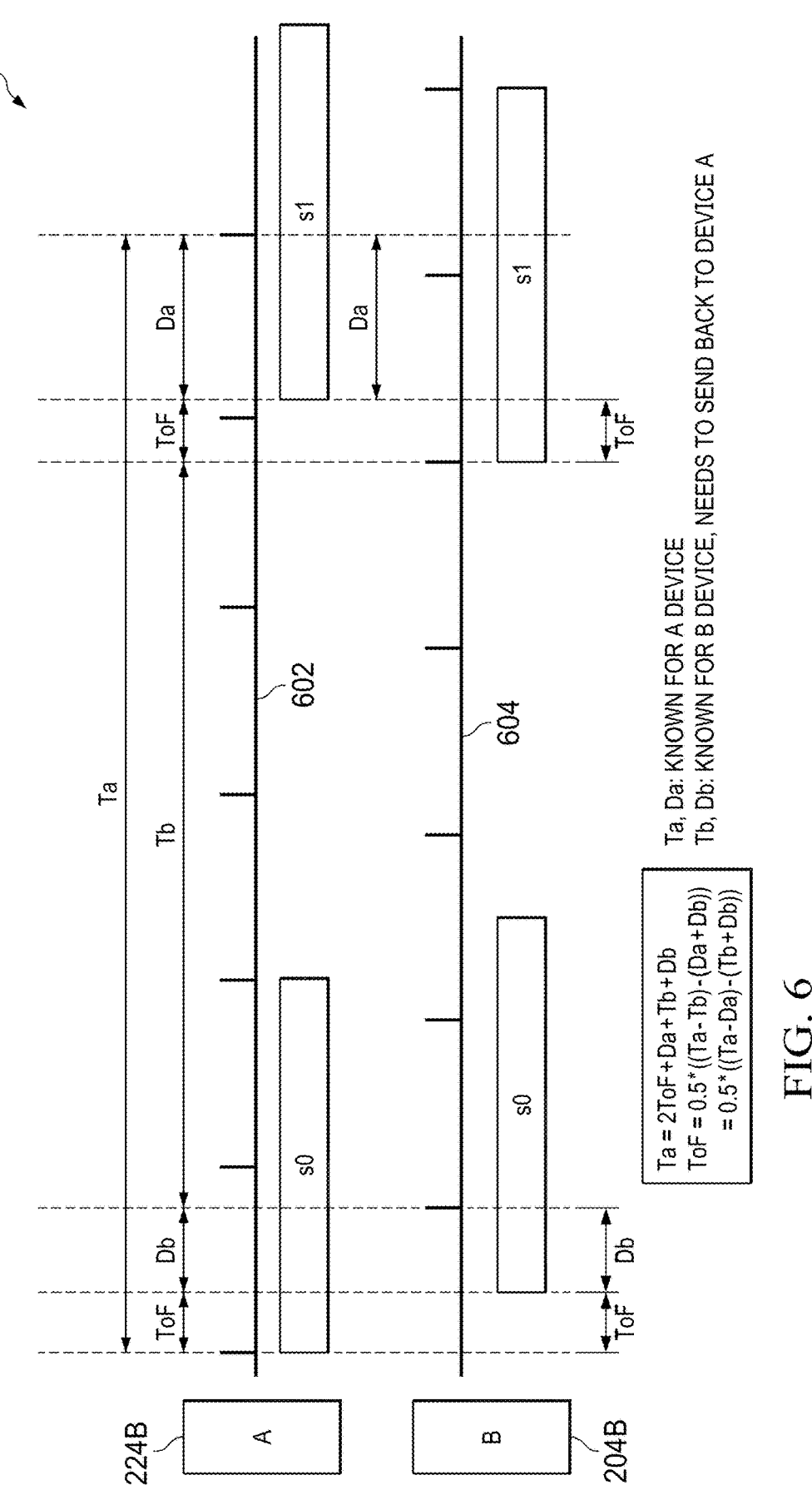
FIG. 6 is a diagram of time-of-flight estimation in accordance with an example embodiment.

FIG. 6 is a diagram 600 of time-of-flight estimation in accordance with an example embodiment. It should be noted that the diagram 600 is not to scale (e.g., the number of clock cycles in a message or response and/or the number of clock cycles to convey a message/response varies from the time scale in FIG. 6). In the diagram 600, a first wireless RF transceiver 224B (an example of the first wireless RF transceiver 224 in FIG. 2) and a second wireless RF transceiver 204B (an example of the second wireless RF transceiver 204 in FIG. 2) communicate via a wireless communication channel. More specifically, the first wireless RF transceiver 224B sends a message s0 (e.g., a car ID with challenge or other message) aligned with its local clock 602. The message s0 is sent to the second wireless RF transceiver 204B and is sampled using a local clock 604 of the second wireless RF transceiver 204B. In some example embodiments, the first and second wireless RF transceivers 224B and 204B do not track each other's local clocks 602 and 604, and thus there is random error when the second wireless RF transceiver 204B samples the message s0.

The second wireless RF transceiver 204B sends a response s1 (e.g., a key response or other response) to the message s0 back to the first wireless RF transceiver 224B, where the response s1 is aligned with the local clock 604 of the second wireless RF transceiver 204B. Later, the response s1 is sampled at the first wireless RF transceiver 224B using the local clock 602 of the first wireless RF transceiver 224B. Because the first and second wireless RF transceivers 224B and 204B do not track each other's local clocks 602 and 604, there is random error when the first wireless RF transceiver 224B samples the response s1.

In the example of FIG. 6, the ToF is less than one clock cycle. Accordingly, use of an integer clock cycle will not provide a target ToF accuracy (e.g., less than a meter). Example intervals for Ta, Tb, Da, and Db are also given in the diagram 600. More specifically, Tb is a first interval value indicates an amount of time between when the second wireless RF transceiver 204B receives message s0 from the first second wireless RF transceiver 224B and when the second wireless RF transceiver 204B transmits the related response s1. Db is a first error value that indicates an offset between when the second wireless RF transceiver 204B sampled the message s0 and a target sampling point (e.g., the next rising clock edge of the local clock 604 of the second wireless RF transceiver 204B). Tb and Db are ToF estimation inputs provided, for example, by the second wireless RF transceiver 204B (e.g., part of a key fob) to the first second wireless RF transceiver 224B (e.g., part of a vehicle) for use with ToF estimation as described herein.

Another ToF estimation input is Ta, which a second interval value that indicates an amount of time between when the first wireless RF transceiver 224B sent the message s0 and when the first wireless RF transceiver 224B received the response s1 from the second wireless RF transceiver 204B. Another ToF estimation input is Da, which is a second error value that indicates an offset between when the first wireless RF transceiver 224B sampled the response s1 and a target sampling point (e.g., the next rising clock edge of the local clock 602 of the first wireless RF transceiver 224B). In some example embodiments, a ToF estimator uses Ta, Da, Tb, and Db to determine a ToF estimate. With these values, the ToF estimate has a higher accuracy compared to conventional approaches that only use the Ta and Tb. This is because the ToF is less than a clock cycle and thus accounting for sampling error at the first and second wireless RF transceivers 224B and 204B helps to improve ToF accuracy.

Figure 7A:
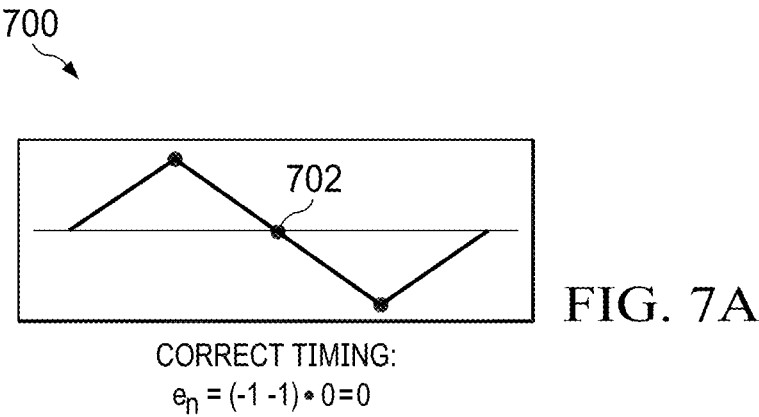
FIGS. 7A-7C are timing diagrams of sampling error estimation in accordance with an example embodiment.
Figure 7B:
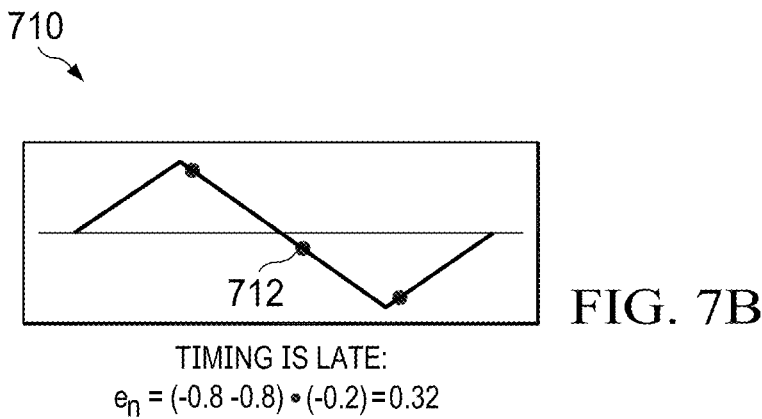
Figure 7C:
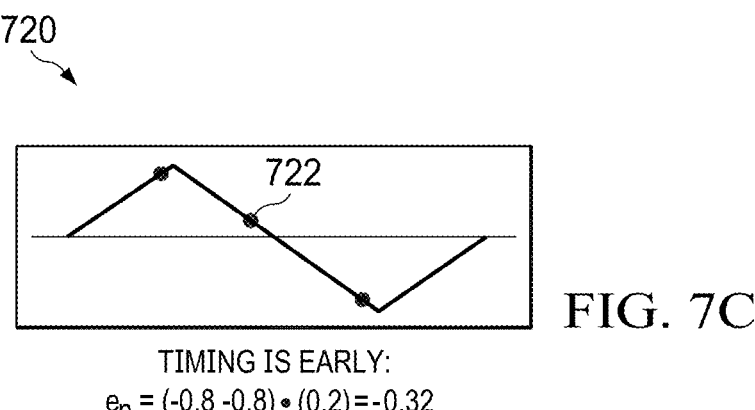

There are different options to measure Da and Db. One option is to use a predetermined sequence for the s0 and s1 signals. This signal should contain enough timing information (transitions) so that they can be recognized and measured at the receiver. One particular example of this option is the Gardner algorithm, illustrated in the timing diagrams 700, 710, and 720 of FIGS. 7A-7C. In some example embodiments, sampling error is determined using an error calculation: $e_n = y[n-1]*(y[n-2]-y[n])$, where $e_n$ is the error for a current sample, $y[n]$ is the current sample, $y[n-1]$ is the sample before $y[n]$, and $y[n-2]$ is the sample before $y[n-1]$. In the timing diagram 700 of FIG. 7A, the sampling point 702 is aligned with a target sampling point and has no error ($e_n=0$). In the timing diagram 710 of FIG. 7B, the sampling point 712 is late relative to a target sampling point and has an error of 0.32 ($e_n=0.32$). In the timing diagram 720 of FIG. 7C, the sampling point 722 is early relative to a target sampling point and has an error of −0.32 ($e_n=-0.32$).

Figure 8:
FIG. 8 is a graph showing the number of packets used for time-of-flight estimation for coarse, fractional, and theoretical options.

FIG. 8 is a graph 800 showing the number of packets (related to the number of message/response cycles) used for ToF estimation for coarse, fractional, and theoretical options. In graph 800, the coarse ToF estimation option (e.g., using Ta and Tb only) does not align with the theoretical option due to the ToF being less than a single clock cycle of a sampling clock. In contrast, the fractional ToF estimation option (e.g., using Ta, Tb, Da, and Db) aligns sufficiently well with the theoretical option within 16 packets to estimate the ToF to within a target accuracy. With a 8 MHz sampling clock and 16 packets, the accuracy using Ta and Tb only is around 2 m. By using the Ta, Tb, Da, and Db, the resolution becomes 25 cm. This is just one example. As previously discussed, the target accuracy and number of packets/samples may vary depending on the particular ToF use case.

FIG. 9 is a flow chart showing a ToF estimation method 900 in accordance with an example embodiment. The method 900 is perform, for example, by an electronic device such as a vehicle with a first wireless RF transceiver (e.g., the first wireless RF transceiver 224 in FIG. 2, the first wireless RF transceiver 224A in FIG. 3, the first wireless RF transceiver 224B in FIG. 6) and ToF estimator (e.g., the ToF estimator 230 of FIG. 2). As shown, the method 900 includes sending, by a first wireless RF transceiver, a plurality of messages (e.g., a car ID with challenge in FIGS. 2 and 3, or message s0 in FIG. 6) to a second wireless RF transceiver at block 902. At block 904, the first wireless RF transceiver receives a plurality of respective responses (e.g., a key response in FIGS. 2 and 3, or response s1 in FIG. 6) to the plurality of messages. At block 906, a ToF estimator (e.g., the ToF estimator 230 in FIG. 2) obtains a plurality of first interval values (e.g., Tb values), each of the plurality of first interval values indicating an amount of time between when the second wireless RF transceiver received a respective one of a plurality of messages and when the second wireless RF transceiver transmitted a respective response. At block 908, the ToF estimator obtains a plurality of first error values (e.g., Db values), each of the plurality of first error values indicating an offset between when the second wireless RF transceiver sampled a respective message of the plurality of messages and a target sampling point for the respective message. At block 910, The ToF estimator obtains a plurality of second interval values (e.g., Ta vales), each of the plurality of second interval values indicating an amount of time between when the first wireless RF transceiver sent a respective message of the plurality of messages and when the first wireless RF transceiver received the respective response. At block 912, the ToF estimator obtains a plurality of second error values (e.g., Da values), each of the plurality of second error values indicating an offset between when the first wireless RF transceiver sampled a respective response and a target sampling point for the respective response. At block 914, the ToF estimator estimates a ToF between the first wireless RF transceiver and the second wireless RF transceiver based on the first interval values, the first error values, the second interval values, and the second error values.

In some example embodiments, the method 900 includes the ToF estimator obtaining an average of the first interval values, an average of the first error values, an average of the second interval values, and an average of the second error values. In such examples, the ToF estimator may estimate the ToF between the first wireless RF transceiver and the second wireless RF transceiver based on the average of the first interval values, the average of the first error values, the average of the second interval values, and the average of the second error values.

In some example embodiments, the method 900 includes the ToF estimator or related component (e.g., the fault detector 236 of FIG. 2) comparing the estimated ToF with a threshold, and asserting a fault signal if the estimated ToF is greater than a threshold. In some example embodiments, embodiments the threshold indicates a distance associated a relay attack or other abnormal condition. In some example embodiments, the first wireless RF transceiver is part of a vehicle and the second wireless RF transceiver is part of a key fob. Also, in some example embodiments, the plurality of messages are sent and the respective responses are received in accordance with a BLE standard.

In some example embodiments, a circuit or system (e.g., the system 200 or related circuits or ICs) includes a first wireless RF transceiver (e.g., the first wireless RF transceiver 224 in FIG. 2, the first wireless RF transceiver 224A in FIG. 3, the first wireless RF transceiver 224B in FIG. 6) and a ToF estimator (e.g., the ToF estimator 230 of FIG. 2). The first wireless RF transceiver includes: a TX chain (e.g., the TX chain 302 in FIG. 3) configured to send a message; and an RX chain (e.g., the RX chain 304 in FIG. 3) configured to receive a response to the message from a second wireless RF transceiver. The ToF estimator is coupled to or included with the RX chain. In some example embodiments, the ToF estimator is configured to: obtain a first interval value (e.g., a Tb value) that indicates an amount of time between when the second wireless RF transceiver received the message and when the second wireless RF transceiver transmitted the response; and obtain a first error value (e.g., a Db value) that indicates an offset between when the second wireless RF transceiver sampled the message and a target sampling point for the message. The ToF estimator is also configured to: obtain a second interval value (e.g., a Ta value) that indicates an amount of time between when the TX chain sent the message and when the RX chain received the response; and obtain a second error value (e.g., a Da value) that indicates an offset between when the RX chain sampled the response and a target sampling point for the response. Additionally, the ToF estimator is configured to estimate a ToF between the first wireless RF transceiver and the second wireless RF transceiver based on the first interval value, the first error value, the second interval value, and the second error value.

In some example embodiments, the TX chain is configured to send a plurality of messages (e.g., card ID with challenge in FIGS. 2 and 3, or message s0 in FIG. 6), and the RX chain is configured to receive a response (e.g., key responses in FIGS. 3 and 3, or message s1 in FIG. 6) to the each of the plurality of messages from the second wireless RF transceiver. In addition, the ToF estimator is configured to obtain a plurality of first interval values (e.g., Tb values), each of the plurality of first interval values indicating an amount of time between when the second wireless RF transceiver received a respective one of the plurality of messages and when the second wireless RF transceiver transmitted a respective response. The ToF estimator is also configured to obtain a plurality of first error values (e.g., Db values), each of the plurality of first error values indicating an offset between when the second wireless RF transceiver sampled a respective message of the plurality of messages and a target sampling point for the respective message. Further, the ToF estimator is configured to obtain a plurality of second interval values (e.g., Ta values), each of the plurality of second interval values indicating an amount of time between when the TX chain sent a respective message of the plurality of messages and when the RX chain received the respective response. The ToF estimator is also configured to obtain a plurality of second error values (e.g., Da values), each of the plurality of second error values indicating an offset between when the RX chain sampled a respective response and a target sampling point for the respective response. In such case, the ToF estimator is configured to estimate the time-of-flight based on the first interval values, the first error values, the second interval values, and the second error values. As another option, the ToF estimator is configured to estimate the ToF based on an average of the first interval values, an average of the first error values, an average of the second interval values, and an average of the second error values.

In some example embodiments, the time-of-flight estimator includes a processor (e.g., the processor(s) 502 in FIG. 5) coupled to memory (e.g., the memory 506 in FIG. 5). The memory stores instructions (e.g., instructions of a ToF estimation inputs analyzer 508 in FIG. 5) for estimating the time-of-flight based on the first interval values, the first error values, the second interval values, and the second error values. In some example embodiments, the ToF estimator is configured to assert a fault signal if the estimated ToF is greater than a threshold. In some example, a circuit with the first wireless RF transceiver and the ToF estimator is included with a vehicle, the threshold is a relay attack threshold, and the fault signal is provided to a vehicle subsystem (e.g., one of the vehicle subsystems 240 in FIG. 2). In some example embodiments, the circuit with the first wireless RF transceiver and the ToF estimator is an IC. In some example embodiments, the TX chain sends the message and the RX chain receives the response in accordance with a BLE standard.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

As used herein, the terms "terminal", "node", "interconnection", "pin" are used interchangeably. Unless specifically stated to the contrary, these terms are generally used to mean an interconnection between or a terminus of a device element, a circuit element, an integrated circuit, a device or other electronics or semiconductor component.

Modifications are possible in the described embodiments, and other embodiments are possible, within the scope of the claims.

What is claimed is:

1. A method comprising:

receiving, by a first device, a first message at a first time;

determining, by the first device, a first offset value between the first time and a next clock cycle of a first clock of the first device;

transmitting, by the first device, a second message at a second time that corresponds to another clock cycle of the first clock;

determining a first time interval between the next clock cycle and the another clock cycle; and transmitting, by the first device, the first time interval and the first offset value.

2. The method of claim 1, wherein determining the first offset value between the first time and the next clock cycle comprises determining the first offset value between the first time and a rising edge of the next clock cycle.

3. The method of claim 1, wherein determining the first offset value comprises determining the first offset value using a Gardner algorithm.

4. The method of claim 1, wherein the first message is a car identification with challenge message, and the second message is a key response message.

5. The method of claim 1, wherein the first device comprises a key fob.

6. The method of claim 1, wherein transmitting the second message comprises transmitting the second message in accordance with a Bluetooth Low Energy (BLE) protocol.

7. The method of claim 1, further comprising:

receiving, by the first device, a wake up message; and transmitting, by the first device, an acknowledge message responsive to the wake up message, wherein transmitting the acknowledge message comprises transmitting the acknowledge message before receiving the first message.

8. The method of claim 1, wherein transmitting the first time interval and the first offset value comprises transmitting the first time interval and the first offset value after transmitting the second message.

9. The method of claim 1, wherein receiving, by the first device, the first message comprises receiving the first message from a second device that comprises a second clock that does not track the first clock.

10. The method of claim 1, wherein receiving, by the first device, the first message comprises receiving the first message from a second device, the method further comprising determining a time-of-flight time between the first and second device based on the first time interval and the first offset value.

11. The method of claim 10, wherein the second device is a vehicle.

12. The method of claim 10, further comprising asserting a fault signal when the time-of-flight time is higher than a threshold.

13. The method of claim 12, further comprising sounding an alarm, turning on a light or disabling another device in response to the assertion of the fault signal.

14. The method of claim 12, further comprising disabling an engine responsive to the assertion of the fault signal.

15. The method of claim 10, wherein the time-of-flight time is smaller than a clock period of the first clock.

16. The method of claim 10, further comprising determining presence detection based on the time-of-flight time.

17. The method of claim 10, further comprising determining spatial positioning based on the time-of-flight time.

18. The method of claim 10, further comprising determining relative movement based on the time-of-flight time.

19. The method of claim 1, further comprising:

transmitting, by a second device, the first message at a third time that corresponds to a first clock cycle of a second clock of the second device;

receiving, by the second device, the second message at a fourth time;

determining, by the second device, a second offset value between the fourth time and a next clock cycle of the second clock;

determining, by the second device, a second time interval between the first clock cycle and the next clock cycle of the second clock;

receiving, by the second device, the first time interval and the first offset value; and determining a time-of-flight time between the first and second device based on the first and second time intervals and the first and second offset values.

20. The method of claim 19, wherein determining the time-of-flight time comprises performing $$ToF = 0.5^{*}((Ta - Tb) - (Da + Db)),$$

wherein ToF represents the time-of-flight time, Ta represents the second time interval, Tb represents the first time interval, Da represents the second offset value, and Db represents the first offset value.

* * * * *